United States Patent
Prasad et al.

(10) Patent No.: US 12,254,543 B2
(45) Date of Patent: Mar. 18, 2025

(54) SYSTEM AND METHOD FOR PERSONALIZED CARTOON IMAGE GENERATION

(71) Applicant: TALENT UNLIMITED ONLINE SERVICES PRIVATE LIMITED, Delhi (IN)

(72) Inventors: Rahul Prasad, Bangalore (IN); Abhishek Sharma, Noida (IN); Mudit Rastogi, Raebareli (IN)

(73) Assignee: Talent Unlimited Online Services Private Limited, South Delhi (IN)

( * ) Notice: Subject to any disclaimer, the term of this patent is extended or adjusted under 35 U.S.C. 154(b) by 0 days.

(21) Appl. No.: 17/985,449

(22) Filed: Nov. 11, 2022

(65) Prior Publication Data

US 2024/0046536 A1    Feb. 8, 2024

(30) Foreign Application Priority Data

Aug. 5, 2022  (IN) .............................. 202271038666

(51) Int. Cl.
  *G06T 11/40*    (2006.01)
  *G06T 7/10*    (2017.01)
  *G06T 11/00*    (2006.01)

(52) U.S. Cl.
  CPC ............... *G06T 11/40* (2013.01); *G06T 7/10* (2017.01); *G06T 11/001* (2013.01); *G06T 2207/30201* (2013.01)

(58) Field of Classification Search
  CPC ......... G06T 11/40; G06T 7/10; G06T 11/001; G06T 2207/30201
  See application file for complete search history.

(56) References Cited

U.S. PATENT DOCUMENTS

| | | | |
|---|---|---|---|
| 11,532,111 B1* | 12/2022 | Zhang | G06V 20/49 |
| 2009/0087035 A1* | 4/2009 | Wen | G06V 40/168 |
| | | | 382/118 |
| 2019/0340419 A1* | 11/2019 | Milman | G06T 13/80 |
| 2021/0343065 A1* | 11/2021 | Lin | G06V 40/16 |

OTHER PUBLICATIONS

Isola, Phillip, et al. ("Image-to-image translation with conditional adversarial networks." Proceedings of the IEEE conference on computer vision and pattern recognition. 2017) (Year: 2017).*
Avatoon ("How to use Avatoon | Tutorial", 2020, https://www.youtube.com/watch?v=rgbwOMtyvf8) (Year: 2020).*

* cited by examiner

Primary Examiner — Xin Sheng
(74) Attorney, Agent, or Firm — Joy S Goudie

(57) ABSTRACT

The embodiments herein provide a system and method for personalized cartoon image generation. The method (100) comprises launching a keyboard interface (101), capturing a digital picture (102), face segmentation using neural network (103), normalization of segmented face (104), face cartoonification (105), which generates bobble head, facial landmark extraction (106), facial expression feature transfer (109) and customization of the generated plurality of cartoon images (110). Hence, the embodiments herein helps in creation of personalized plurality of cartoon images to make the user part of the conversations and the graphics or content shared look similar to the user input face and more aesthetically pleasing instead of using any reference stickers to convey the messages.

15 Claims, 8 Drawing Sheets

SYSTEM AND METHOD FOR PERSONALIZED CARTOON IMAGE GENERATION

CROSS-REFERENCE TO RELATED APPLICATION

The embodiments herein claims the priority of the Indian Non-Provisional Patent Application (NPA) with serial number IN 202211038666 filed on Jul. 5, 2022, with the title, "A SYSTEM AND METHOD FOR PERSONALIZED CARTOON IMAGE GENERATION", and the content of which is included in its entirety as reference herein.

BACKGROUND

Technical Field

The embodiments herein are generally related to a field of data processing. The embodiments herein are particularly related to training a neural network to generate cartoon images based on user images. The embodiments herein are more particularly related to a system and method for personalized cartoon image generation, with customized stickers with various expressions.

Description of Related Art

Inage is the visual or electronic representation of the person in the social media platform like Facebook, WhatsApp, Instagram. Image is the graphical representation of the subject's facial characteristics. Many digital platforms convert face spatial representation to a two-dimensional form image which is formed by using a few attributes of the subject's face like hair style, color, skin tone, eye color etc., to digitally craft a custom avatar or image similar to subjects. For instance, if the subject image has curly hair, fair skin tone, and blue eyes then an avatar or image is designed based on subject attributes from a plurality of image attribute templates. Like in this case from a pool of hair template curly resemblance will be selected, blue eyes attributes will be selected eye template and face is designed by getting skin tone color from color templates. Furthermore, designed avatars or images are subjected to further deformation based on measured facial attributes and other attributes.

In addition, avatar or image designed by prior methodology gives identical resemblance for most of the subjects of similar facial attributes or belongs to the same ethnic groups. Furthermore, avatar or image should be more personalized and easily distinguishable. People connected to each other must feel a connection at an emotional level while communicating or sharing publicly, on digital platforms.

Hence, there is a long-felt need for a system and a method for personalized cartoon image generation, to create an avatar or image that includes most of the facial attributes of the subject which gives resemblance to the actual face of the subject. Still there is a need for an artificial intelligence powered cartoon image generation model are used to generate a personalized avatar or image by ensuring a usage of most of the facial attributes.

The above-mentioned shortcomings, disadvantages and problems are addressed herein, and which will be understood by reading and studying the following specification.

OBJECTIVES OF THE EMBODIMENTS HEREIN

An object of the embodiments herein is to provide a system and a method for personalized cartoon image generation.

Another object of the embodiments herein is to provide a system and method for personalized cartoon image generation, to generate an avatar or image that includes most of the facial attributes of the subject which gives resemblance to the actual face of the subject.

Yet another object of the embodiments herein is to provide a system and method for personalized cartoon image generation, powered by artificial intelligence which makes sure that most of the facial attributes are used to generate a personalized image.

Yet another object of the embodiments herein is to customize the generated plurality of cartoon image with plurality of styles and plurality of sticker bodies such as storied, gif's and stickers.

These and other objects and advantages of the embodiments herein will become readily apparent from the following detailed description taken in conjunction with the accompanying drawings.

SUMMARY

The embodiments herein provide a method and system for personalized cartoon image generation. The method and system disclosed herein involves creation of personalized cartoon image or stickers to make the users part of the conversation and the graphics or content shared look similar to the user face and more aesthetically pleasing instead of using any reference stickers to convey the messages. Furthermore, the method and system utilizes image generation algorithms replicated on the CPU as well as on GPU such that creation of users' personalized heads can be eased and automated.

According to an embodiment herein, a method for personalized cartoon image generation is provided. The method disclosed herein comprises the steps of launching a bobble keyboard by clicking on an application icon from a device application launcher by a user and capturing a digital picture displaying a photorealistic content acquired with a plurality of sensors used on a mobile device. The digital picture includes jpeg, png and raw file images. The method further includes subjecting the digital picture to face segmentation to produce a segmented picture of the user's face and normalizing the segmented picture to obtain a facial normalized image. The normalization is performed to scale the segmented picture into a range more familiar or normal to the senses, such that the image looks better for the visualizer. The range of the facial normalized image of pixel intensity values is projected to the predefined range between [−1] to [1]. Furthermore, the method involves feeding the facial normalized image to a trained AI (Artificial Intelligence) model as an input for face cartoonification. The trained AI model learns cartoon facial characteristics that co-relate to a photorealistic image facial feature. In addition, the method includes aligning the facial normalized image fed to the trained AI model as an input using facial landmark extraction library and extracting facial landmark of the photorealistic image by using 68 face landmark points to obtain a plurality of cartoon image. The extraction of facial landmark includes one to one mapping of media-pipe facial points to dlib facial points. Further, the method includes passing the aligned facial normalized image as an input to an encoder architecture to extract, optimize and condense a latent vector of the input. Then, manipulating the condensed latent vector using direction vector of expressions such as smile or sad. Besides, the method includes decoding the manipulated condensed latent vector using a GAN (Generative Adversarial Network) generator to transfer facial expression feature. Finally, the method includes customizing the plurality of cartoon images produced by the trained AI (Artificial Intelligence) model, based on the facial landmark extracted with a plurality of sticker bodies and a plurality of styles.

According to an embodiment herein, the face segmentation employs a pretrained mobileunet model which is a combination of mobile net and UNET that has been trained on user photos. The pretrained mobileunet model extracts the face from the backdrop.

According to an embodiment herein, the facial normalized image as an input to the trained AI model corresponds to a digital image depicting a face of a person. The AI model is trained using the supervised approach, in which a paired data corresponding to photorealistic images and a plurality of cartoon images of the photorealistic images are used for training. Furthermore, the trained AI model is configured as a PIX2PIX GAN to output the plurality of cartoon image of the digital image uploaded by the user.

According to an embodiment herein, the extraction of facial landmark such as nose, eyes, left cheek, chin and right cheek to identify the face tone in the photorealistic image and to merge the customized sticker body to the cartoon image, and also to add aesthetic features to the cartoon image. The aesthetic features include face glow, smoothening and so on.

According to an embodiment herein, the customization of the plurality of cartoon image includes extracting and transferring the face tone of the photorealistic image to the generated plurality of cartoon image. The customized plurality of cartoon image with the plurality of sticker bodies includes stories, gifs, and stickers.

According to an embodiment herein, a system for personalized cartoon image generation is disclosed. The system comprises an input module configured to receive a digital picture displaying a photorealistic content acquired with a plurality of sensor used on a mobile device by a user. The digital picture includes jpeg, png and raw file images. A face segmentation encoder module, which is a pre-trained machine learning model configured to receive training image data, to extract face mask from the digital picture uploaded by the user, and to generate condensed feature vectors indicative of the face depicted in the input digital picture. The condensed feature vectors extracted is an image embedding. The training image data includes a pair of photorealistic user images and the cartoon versions of the respective photorealistic user images. The system further includes an AI (Artificial Intelligence) module comprising a generator and a discriminator configured to receive the image embedding as an input and create plurality of cartoon images. The generator and the discriminator in conjunction constitutes an image-to-image translation network. In addition, the system comprises an output module configured to generate a customized plurality of cartoon images comprising a plurality of styles and a plurality of sticker bodies and the plurality of sticker bodies includes stories, gifs, and stickers.

According to an embodiment herein, the image-to-image translation network is a PIX2PIX GAN, based on a generative adversarial network, which is used to learn the mapping between the real image (display picture) and the target image (cartoon image).

According to an embodiment herein, the AI module consists of a generator and a discriminator, collectively referred to as an image-to-image translation network. The generator is configured to generate plurality of cartoon images based on the input/target pair. The discriminator is configured to determine whether the input/output pair has a close resemblance to the input/target pair, and also the discriminator is used to compare the input/output pair to the input/target pair, to improve the identity, minimize loss and expression preservation while training the network.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of an illustration and not of a limitation. Many changes and modifications may be made within the scope of the embodiments herein without departing from the spirit thereof, and the embodiments herein include all such modifications.

BRIEF DESCRIPTION OF THE DRAWINGS

The other objects, features, and advantages will occur to those skilled in the art from the following description of the preferred embodiment and the accompanying drawings in which.

Figure 1:
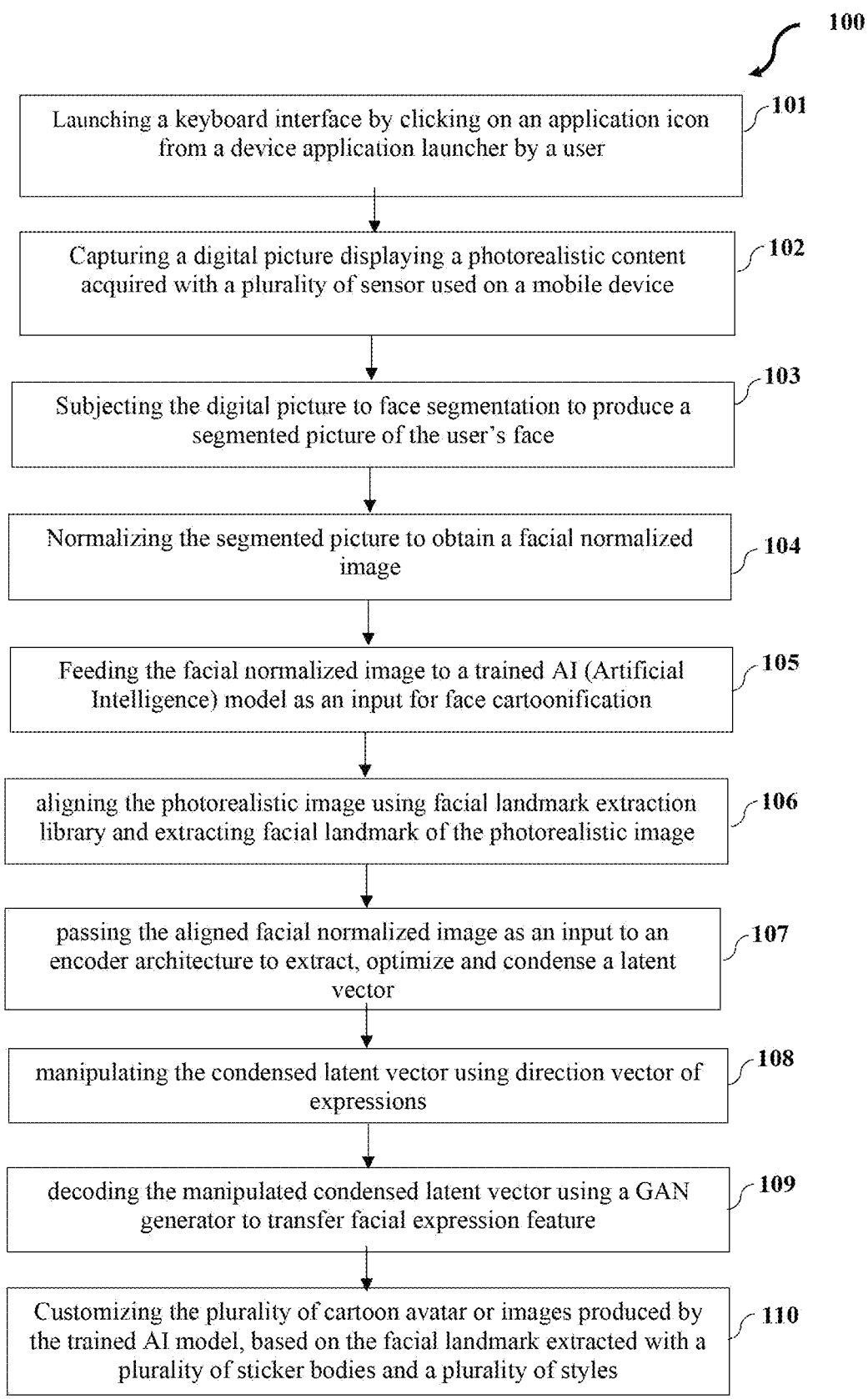
FIG. 1 illustrates a method for personalized cartoon image generation, according to an embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical, and other changes may be made without departing from the scope of the embodiments. The following detailed description is therefore not to be taken in a limiting sense.

The embodiments herein provide a method and system for personalized cartoon image generation. The method and system disclosed herein involves creation of personalized cartoon image or stickers to make the users part of the conversation and the graphics or content shared look similar to the user face and more aesthetically pleasing instead of using any reference stickers to convey the messages. Furthermore, the method and system utilizes image generation algorithms replicated on the CPU as well as on GPU such that creation of users' personalized heads can be eased and automated.

The embodiments herein provide a method for personalized cartoon image generation. The method disclosed herein comprises the steps of launching a bobble keyboard by clicking on an application icon from a device application launcher by a user and capturing a digital picture displaying a photorealistic content acquired with a plurality of sensor used on a mobile device. The digital picture includes jpeg, png and raw file images. The method further includes subjecting the digital picture to face segmentation to produce a segmented picture of the user's face and normalizing the segmented picture to obtain a facial normalized image. The normalization is performed to scale the segmented picture into a range more familiar or normal to the senses, such that the image looks better for the visualizer. The range of the facial normalized image of pixel intensity values is projected to the predefined range between [−1] to [1]. Furthermore, the method involves feeding the facial normalized image to a trained AI (Artificial Intelligence) model as an input for face cartoonification. The trained AI model learns cartoon facial characteristics that co-relate to a photorealistic image facial feature. In addition, the method includes aligning the facial normalized image fed to the trained AI model as an input using facial landmark extraction library and extracting facial landmark of the photorealistic image by using 68 face landmark points to obtain a plurality of cartoon image. The extraction of facial landmark includes one to one mapping of media-pipe facial points to dlib facial points. Further, the method includes passing the aligned facial normalized image as an input to an encoder architecture to extract, optimize and condense a latent vector of the input. Then, manipulating the condensed latent vector using direction vector of expressions such as smile or sad. Besides, the method includes decoding the manipulated condensed latent vector using a GAN (Generative Adversarial Network) generator to transfer facial expression feature. Finally, the method includes customizing the plurality of cartoon images produced by the trained AI (Artificial Intelligence) model, based on the facial landmark extracted with a plurality of sticker bodies and a plurality of styles.

According to one embodiment herein, the face segmentation employs a pretrained mobileunet model which is a combination of mobile net and UNET that has been trained on user photos. The pretrained mobileunet model extracts the face from the backdrop.

According to one embodiment herein, the facial normalized image as an input to the trained AI model corresponds to a digital image depicting a face of a person. The AI model is trained using the supervised approach, in which paired data corresponding to photorealistic images and cartoon images of the photorealistic images are used for training. Furthermore, the trained AI model is configured as a PIX2PIX GAN to output the plurality of cartoon images of the digital image uploaded by the user.

According to one embodiment herein, the extraction of facial landmark that includes nose, eyes, left cheek, chin and right cheek to identify the face tone in the photorealistic image and to merge the customized sticker body to the cartoon image, and also to add aesthetic features to the cartoon image. The aesthetic features include face glow, smoothening and so on.

According to one embodiment herein, the customization of the plurality of cartoon images includes extracting and transferring the face tone of the photorealistic image to the generated plurality of cartoon image. The customized plurality of cartoon images with the plurality of sticker bodies includes stories, gifs, and stickers.

According to one embodiment herein, a system for personalized cartoon image generation is disclosed. The system comprises an input module configured to receive a digital picture displaying a photorealistic content acquired with a plurality of sensor used on a mobile device by a user. The digital picture includes jpeg, png and raw file images. A face segmentation encoder module, which is a pre-trained machine learning model configured to receive training image data, to extract face mask from the digital picture uploaded by the user, and to generate condensed feature vectors indicative of the face depicted in the input digital picture. The condensed feature vectors extracted is an image embedding. The training image data includes a pair of photorealistic user images and the cartoon versions of the respective photorealistic user images. The system further includes an AI (Artificial Intelligence) module comprising a generator and a discriminator configured to receive the image embedding as an input and create plurality of cartoon images. The generator and the discriminator in conjunction constitutes an image-to-image translation network. In addition, the system comprises an output module configured to generate a customized plurality of cartoon images comprising a plurality of styles and a plurality of sticker bodies and the plurality of sticker bodies includes stories, gifs, and stickers.

According to one embodiment herein, the image-to-image translation network is a PIX2PIX GAN, based on a generative adversarial network, which is used to learn the mapping between the real image (display picture) and the target image (cartoon image).

According to one embodiment herein, the AI module consists of a generator and a discriminator, collectively referred to as an image-to-image translation network. The generator is configured to generate cartoon image based on the input/target pair. The discriminator is configured to determine whether the input/output pair has a close resemblance to the input/target pair, and also the discriminator is used to compare the input/output pair to the input/target pair, to improve the identity, minimize loss and expression preservation while training the network.

FIG. 1 illustrates a method for personalized cartoon image generation, according to an embodiment herein. With regard to FIG. 1, represents an exemplary method 100 disclosed herein employs a method for personalized cartoon image generation. In the method disclosed herein, comprises the steps of launching a keyboard interface such as bobble keyboard by clicking on an application icon from a device application launcher by a user at step 101 and capturing a digital picture displaying a photorealistic content acquired with a plurality of sensor used on a mobile device at step 102. The method further includes subjecting the digital picture to face segmentation to produce a segmented picture of the user's face at step 103 and normalizing the segmented picture to obtain a facial normalized image at step 104. The normalization is performed to scale the segmented picture into a range more familiar or normal to the senses, such that the image looks better for the visualizer. Furthermore, the method involves feeding the facial normalized image to a trained AI (Artificial Intelligence) model as an input for face cartoonification at step 105. The trained AI model learns cartoon facial characteristics that co-relate to a photorealistic image facial feature. In addition, the method includes aligning the facial normalized image fed to the trained AI model as an input using facial landmark extraction library and extracting facial landmark of the photorealistic image by using 68 face landmark points to obtain a plurality of cartoon images at step 106. The extraction of facial landmark includes one to one mapping of media-pipe facial points to dlib facial points. Further, the method includes passing the aligned facial normalized image as an input to an encoder architecture to extract, optimize and condense a latent vector of the input at step 107. Then, manipulating the condensed latent vector using direction vector of expressions such as smile or sad at step 108. Besides, the method includes decoding the manipulated condensed latent vector using a GAN (Generative Adversarial Network) generator to transfer facial expression feature at step 109. Finally, the method includes customizing the plurality of cartoon images or avatar produced by the trained AI (Artificial Intelligence) model, based on the facial landmark extracted with a plurality of sticker bodies and a plurality of styles at step 110.

Figure 1B:
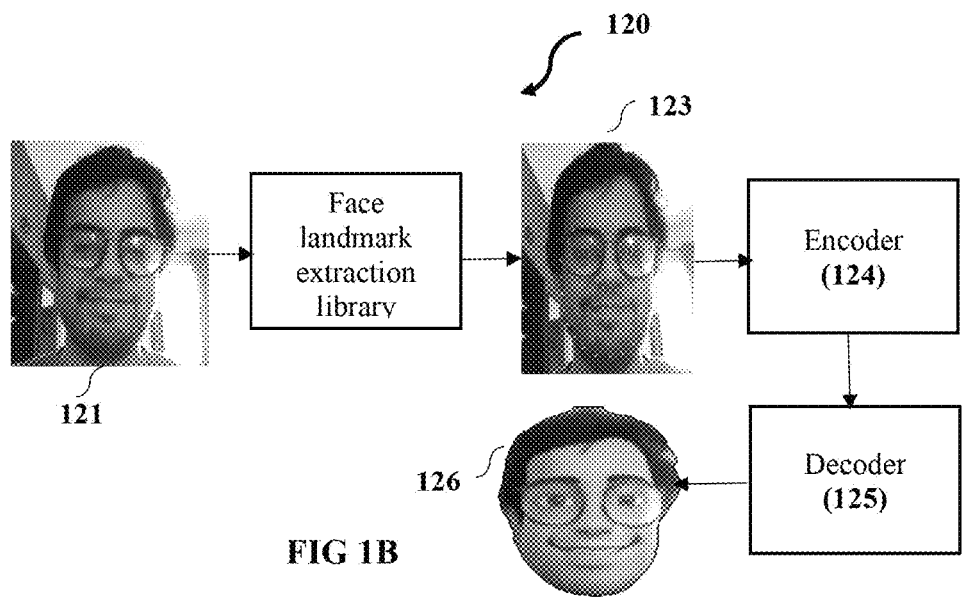
FIG. 1B illustrates a block-diagram of transferring facial expression feature, according to an embodiment herein.

FIG. 1B illustrates a block-diagram of transferring facial expression feature, according to an embodiment herein. In an embodiment, the block diagram 120 illustrates a method of transferring facial expression feature to the plurality of cartoon images. The method 120 illustrates an input image 121 fed to the trained AI model using a face landmark extraction library 122, such that the method 120 aligns the input image and extracts facial landmark of the input image by using 68 face landmark points to obtain a plurality of cartoon images. Further the method includes passing the aligned input image as an input to an encoder 124 architecture to extract, optimize and condense a latent vector of the input image. Then the condensed latent vector of the input image 121 is manipulated using direction vector of expressions such as smile or sad. Besides, the method 120 involves passing the manipulated condensed latent vector to a decoder 125 using a GAN (Generative Adversarial Network) generator to transfer facial expression feature 126. For instance, the block-diagram 120 illustrates for an input image 121 a person with the beard and smiling face, a cartoonized image without beard and a smiling face is obtained through facial expression feature.

Figure 1C:
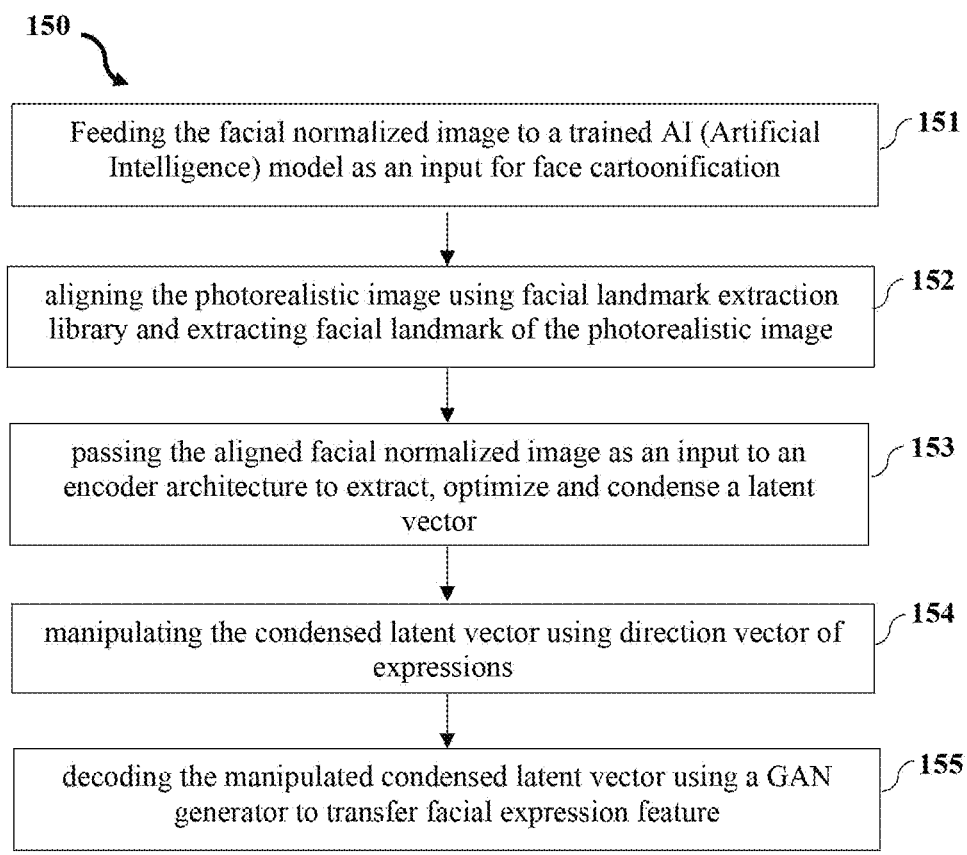
FIG. 1C illustrates a flowchart on method for transferring facial expression feature, according to an embodiment herein.

FIG. 1C illustrates a illustrates a flowchart on method for transferring facial expression feature, according to an embodiment herein. The method 150 includes feeding the facial normalized image to a trained AI (Artificial Intelligence) model as an input for face cartoonification at step 151. The trained AI model learns cartoon facial characteristics that co-relate to a photorealistic image facial feature. In addition, the method includes aligning the facial normalized image fed to the trained AI model as an input using facial landmark extraction library and extracting facial landmark of the photorealistic image by using 68 face landmark points to obtain a plurality of cartoon images at step 152. The extraction of facial landmark includes one to one mapping of media-pipe facial points to dlib facial points. Further, the method includes passing the aligned facial normalized image as an input to an encoder architecture to extract, optimize and condense a latent vector of the input at step 153. Then, manipulating the condensed latent vector using direction vector of expressions such as smile or sad at step 154. Besides, the method includes decoding the manipulated condensed latent vector using a GAN (Generative Adversarial Network) generator to transfer facial expression feature at step 155.

Figure 2:
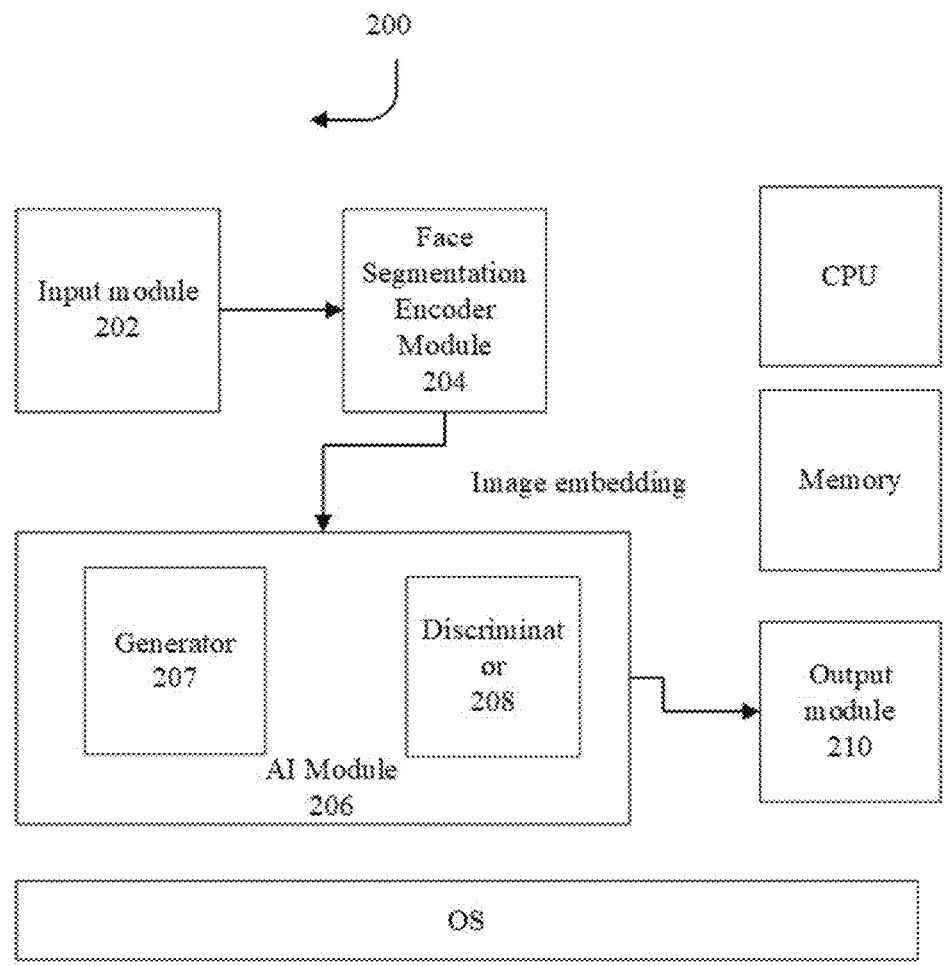
FIG. 2 illustrates a high-level block diagram of a system for personalized cartoon image generation, according to an embodiment herein.

FIG. 2 illustrates a high-level block diagram of a system for personalized cartoon image generation, according to an embodiment herein. In an embodiment, the system 200 comprises an input module 202 configured to receive a digital picture displaying a photorealistic content acquired with a plurality of sensor used on a mobile device by a user. The digital picture includes jpeg, png and raw file images. A face segmentation encoder module 204, which is a pre-trained machine learning model configured to receive training image data, to extract face mask from the digital picture uploaded by the user, and to generate condensed feature vectors indicative of the face depicted in the input digital picture. The condensed feature vectors extracted is an image embedding. The training image data includes a pair of photorealistic user images and the cartoon versions of the respective photorealistic user images. The system further includes an AI (Artificial Intelligence) module 206 comprising a generator 207 and a discriminator 208 configured to receive the image embedding as an input and create plurality of cartoon images. The generator 207 and the discriminator 208 in conjunction constitutes an image-to-image translation network. In addition, the system comprises an output module 210 configured to generate a customized plurality of cartoon images comprising a plurality of styles and plurality of sticker bodies and the plurality of sticker bodies includes stories, gifs, and stickers.

Figure 3:
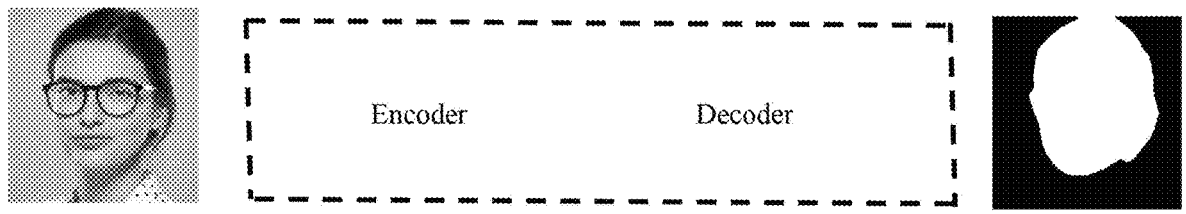
FIG. 3 exemplarily illustrates the face segmentation carried out using mobile net and UNET model, according to an embodiment herein.

FIG. 3 exemplarily illustrates the face segmentation carried out using mobile net and UNET model, according to an embodiment herein. The face segmentation is carried out mobileunet model, which is a combination of mobile net and UNET that has been trained on user photos. The encoder 302 utilizes pre-trained classification network like VGG/ResNet, where convolution blocks are followed by a max pool down sampling to encode the input image into feature representations at a plurality of different/distinct levels. Furthermore, the decoder 304 semantically project the discriminative features (lower resolution) learned by the encoder 302 onto the pixel space (higher resolution) to get a dense classification. The decoder 304 consists of up sampling and concatenation followed by regular convolution operations.

Figure 4:
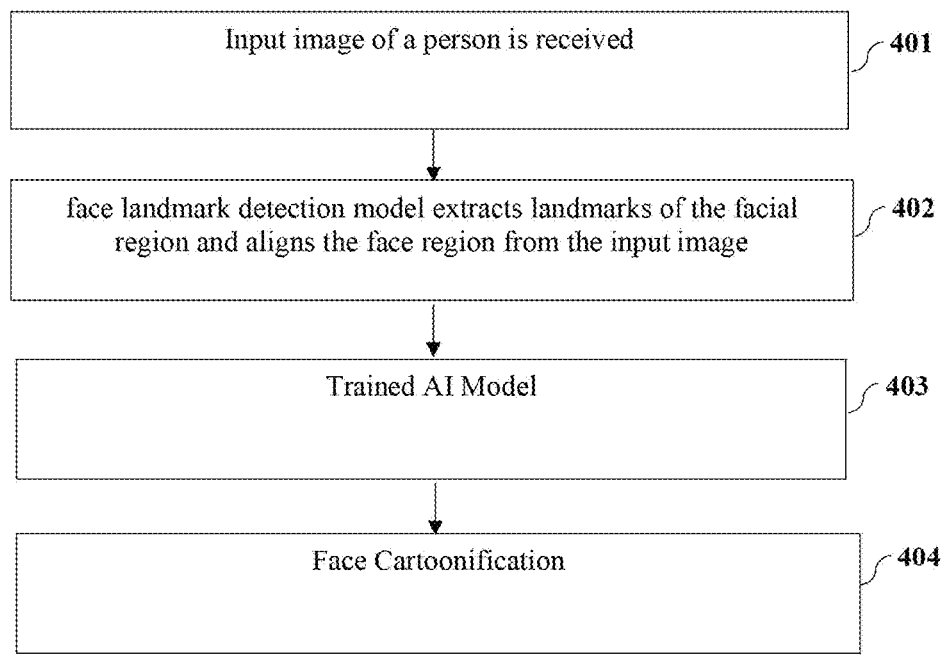
FIG. 4 illustrates a flowchart of trained AI model with acquired cartoon facial characteristics co-relating to photorealistic image facial features, according to one embodiment herein.

FIG. 4 illustrates a flowchart of trained AI model with acquired cartoon facial characteristics co-relating to photorealistic image facial features, according to one embodiment herein. In an embodiment, an input image of a person is received at step 401. At step 402, the face landmark detection model extracts landmarks of the facial region and aligns the face region from the input image. The digital image that contains only the face region is provided as input to a deep-learning model that has been trained using a supervised approach, to identify the cartoon facial features that correspond to facial features depicted in digital images at step 403. Furthermore, the trained deep-learning model is trained using supervised training. Further, the trained machine learning model is trained, at least in part, to identify cartoon facial features (e.g., that are part of one or more facial feature landmarks) that correspond to facial features depicted in digital images at step 404. In addition, the parameterized weights are received as output from the machine learning model. In accordance with the principles discussed herein, the parameterized weights describe the cartoon features the deep learning model identified as corresponding to the person's facial features based on the digital image. By way of example, the parameterized cartoon head is received as the output of the trained deep learning model.

Figure 5:
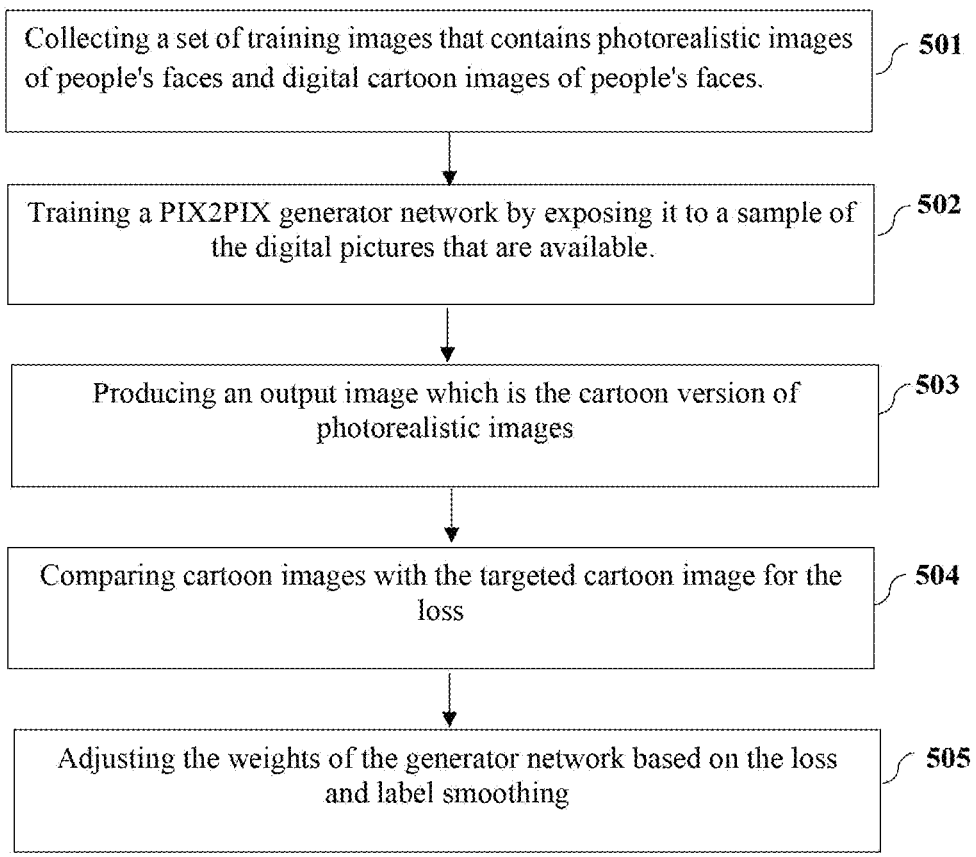
FIG. 5 illustrates a flowchart of AI model configured as PIX2PIX GAN to output the plurality of cartoon images, according to an embodiment herein.

FIG. 5 illustrates a flowchart of AI model configured as PIX2PIX GAN to output the cartoon image, according to an embodiment herein. In an embodiment, a set of training images is collected, that contains photorealistic images of people's faces and digital cartoon images of people's faces at step 501. A PIX2PIX GAN generator network is trained by exposing it to a sample of the digital pictures that are available at step 502. The output cartoon image of the generated model and the given input, photorealistic image pair of images is the generated pair or fake pair. Further, the received input image (photorealistic image) is passed through a series of convolution and up-sampling layers. Finally, the method produces an output image which is the cartoon version of photorealistic images at step 503. Furthermore, at step 504, the generated cartoon images are compared with the targeted cartoon image for the loss. Finally, the weights of the generator network is adjusted based on the loss and label smoothing is carried out at step 505. The label smoothing is a regularization technique, which is used to train deep neural networks, such that the technique can improve the generalization of models effectively. Furthermore, the label smoothing regularization technique also reduces the logit gap, which improves the quality of cartoon image generated. A large logit gap makes the model less adaptive.

Figure 6:
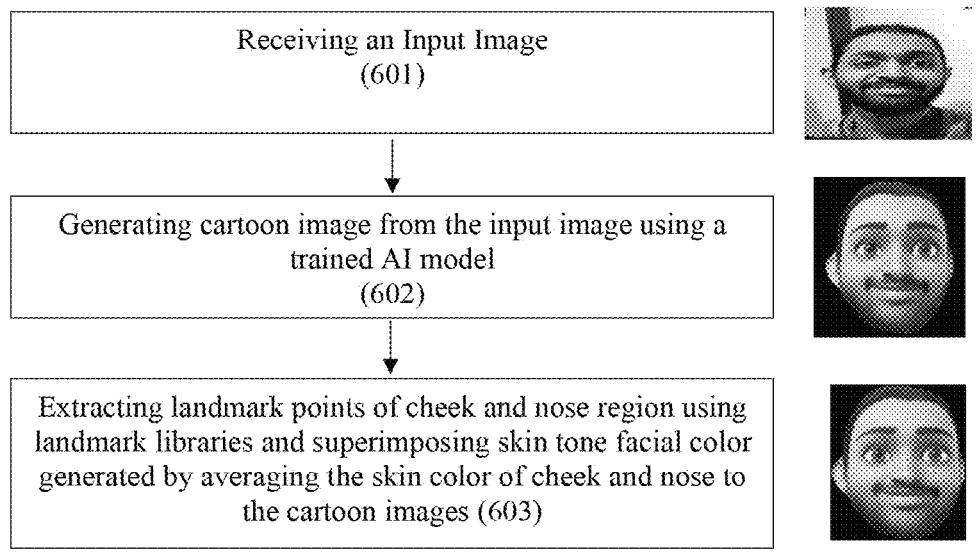
FIG. 6 illustrates a flowchart of customization of the generated plurality of cartoon images, according to an embodiment herein.

FIG. 6 illustrates a flowchart of customization of the generated cartoon image, according to an embodiment herein. In an embodiment, the face tone of the photorealistic image extracted is customized and transferred to a generated cartoon image. At step 601, an input image is received. Further, at step 602, a cartoon image is generated from the input image (photorealistic image) using a trained AI model. Finally, at step 603, landmark points of cheek and nose region is extracted using landmark libraries and skin tone facial color generated by averaging the skin color of cheek and nose to cartoon images is superimposed.

Furthermore, customization of the plurality of sticker bodies to the generated plurality of cartoon images is carried out by selecting suitable stickers for the generated cartoon head from the pool of stickers based on the attributes. For instance, while creating the head, attributes such as gender, age sticker bodies are selected, and heads are aligned to the sticker bodies with different conditions based upon the requirements of the stickers. The different conditions include face rotation, face color selection, dress for the body, movement of sticker body to produce gifs and accessories addition on face and sticker body.

Figure 7:
FIG. 7, illustrates a picture of cartoon version vs segmented image according to an embodiment herein.

FIG. 7, illustrates a picture of cartoon version vs segmented image according to an embodiment herein. FIG. 7 illustrates a picture 700, in which the first part of the picture is the cartoon version and the second part. Training data to develop AI models to generate the human body consists of pair images data. Each pair of images contains one segmented human face and one cartoon image created by a graphical illustrator who maintains the resemblance of human features in the cartoon image. Segmentation of the human face is performed by face segmentation model using mobileunet algorithm.

Figure 8A:
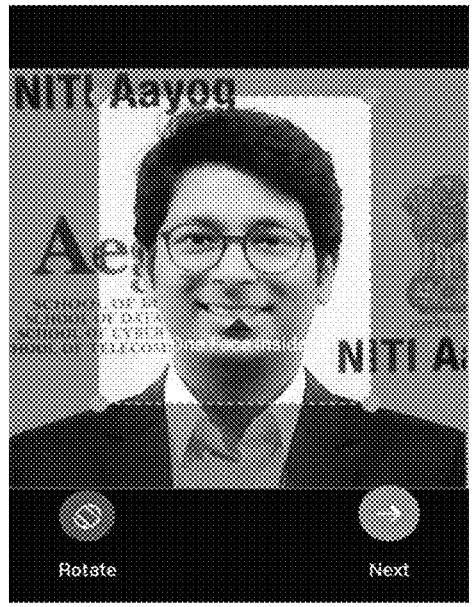
FIG. 8A-8D illustrates a screenshot of application on method for personalized cartoon image generation, according to an embodiment herein.
Figure 8B:
Figure 8C:
Figure 8D:

FIG. 8A-8D illustrates a screenshot of application on method for personalized cartoon image generation, according to an embodiment herein. FIG. 8A illustrates a screenshot, wherein initially the application is launched and the system 200 receives an input image from the user either by clicking an image from the camera or the user can choose an image from a gallery of already saved images. FIG. 8B illustrates a screenshot, wherein the system 200 then receives the gender of the user. Further, cartoonification of the face is done according to the gender of the user. For instance, a male cartoon head will contain mustache and a beard to make it as a cartoon image. Furthermore, the FIG. 8C illustrates the screenshot of final output which cartoon image. Finally, FIG. 8D illustrates a screenshot of customized cartoon image generated with sticker bodies.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications.

The embodiments herein provide a system and method for personalized cartoon image generation. The main advantage of the system and method for personalized cartoon image generation is that the method helps to generate customized stickers with various expressions. The embodiments herein also produces more realistic expression and feature, which are copied to user's cartoon characters. In terms of efficiency the system is capable of processing images and generate a number of stickers in less than 500 ms. Furthermore, the embodiments herein works best for images captured in low lightning conditions for different ethnicities.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

We claim:

1. A method (100) for personalized cartoon image generation comprising the steps of:
    a. launching a keyboard interface by clicking on an application icon from a device application launcher by the user (101);
    b. capturing a digital picture displaying a photorealistic content, acquired with a plurality of sensors used on a mobile device (102);
    c. subjecting the digital picture to face segmentation to produce a segmented picture of the user's face (103);
    d. normalizing the segmented picture to obtain a facial normalized image (104), and wherein normalization is performed to scale the segmented picture into a range which is familiar or normal to the senses, such that visual appearance of image is increased for the visualizer;

e. feeding the facial normalized image to a trained AI (Artificial Intelligence) model as an input for face cartoonification (105), and wherein the trained AI model learns cartoon facial characteristics that co-relate to a photorealistic image facial feature;

f. aligning the facial normalized image fed to the trained AI mode as an input using facial landmark extraction library and extracting facial landmark of the photorealistic image (106) by using 68 face landmark points to obtain a plurality of cartoon images, and wherein the extraction of facial landmark includes one to one mapping of media-pipe facial points to dlib facial points;

g. passing aligned facial normalized image to an encoder architecture to extract, optimize, and condense a latent vector;

h. manipulating the condensed latent vector using direction vector of expressions, and wherein the direction vector of expressions includes smile sad;

i. decoding manipulated condensed latent vector using a GAN (Generative Adversarial Network) generator to transfer facial expression feature; and j. customizing the plurality of cartoon images (107) produced by the trained AI (Artificial Intelligence) model based on the facial landmark extracted, and wherein the plurality of cartoon images generated is customized with a plurality of sticker bodies and a plurality of styles.

2. The method (100) as claimed in claim 1, wherein the digital picture includes jpeg, png, and raw file images.

3. The method (100) as claimed in claim 1, wherein the face segmentation employs a pretrained mobileunet model which is a combination of mobile net and UNET that has been trained on user photos, and wherein the pretrained mobileunet model extracts the face from the backdrop.

4. The method (100) as claimed in claim 1, wherein the range of the facial normalized image of pixel intensity values is projected to the predefined range between [−1] to [1].

5. The method (100) as claimed in claim 1, wherein the facial normalized image as an input to the trained AI model corresponds to a digital image depicting a face of a person, and wherein the AI model is trained using the supervised approach, in which paired data corresponding to photorealistic images and cartoon images of photorealistic images are used for training.

6. The method (100) as claimed in claim 1, wherein the trained AI model is configured as a PIX2PIX GAN (Generative Adversarial Network) to output the cartoon image corresponding to the digital picture captured by the user.

7. The method (100) as claimed in claim 1, wherein the extraction of facial landmark is done to identify the face tone in the photorealistic image and to merge the customized sticker body to the cartoon image and also to add aesthetic features to the cartoon image, and wherein the facial landmark includes nose, eyes, left cheek, chin, and right cheek, and wherein the aesthetic features include face glow and smoothening.

8. The method (100) as claimed in claim 1, wherein the customized cartoon image with the plurality of sticker bodies includes stories, gifs, and stickers.

9. A system (200) for personalized cartoon image generation, said system configured to:

receive a digital picture displaying photorealistic content acquired with a plurality of sensors used on a mobile device of a user;

receive training image data, perform face segmentation on received digital picture and produce a segmented picture of the user's face, normalize the segmented picture to obtain a facial normalized image, and generate condensed feature vectors indicative of the user's face depicted in the digital picture, and wherein said system (200) employs a pre-trained MobileUNET model, said MobileUNET model being a combination of Mobilenet and UNET trained on people's photos, and wherein the pre-trained MobileUNET model extracts the user's face from the backdrop in the digital picture;

receive the facial normalized image as an input, and wherein said system (200) is trained using paired data corresponding to photorealistic images and respective cartoon images of the photorealistic images, said system (200) further configured to extract a facial landmark of the photorealistic content by using a plurality of face landmark points to obtain at least one cartoon image, and wherein extraction of the facial landmark is performed to identify a face tone in the photorealistic content, merge a customized sticker body with the cartoon image, and add aesthetic features to the cartoon image, and wherein the facial landmark includes nose, eyes, left cheek, chin, and right cheek, and wherein the aesthetic features include face glow and smoothening; and customize the cartoon image by adding at least the customized sticker body and a customized style to the cartoon image.

10. The system (200) as claimed in claim 9, wherein the training image data includes a pair of the photorealistic content and respective cartoon versions of the photorealistic content.

11. The system (200) as claimed in claim 9, wherein said system:

constitutes an image-to-image translation network and wherein the image-to-image translation network is a PIX2PIX GAN (Generative Adversarial Network) configured to learn a mapping between the display picture and the cartoon image corresponding to the display picture; and wherein the system (200) is further configured to generate a plurality of cartoon images based on a pair of the display picture and the cartoon image corresponding to the display picture, and wherein the system (200) is configured to determine whether the pair of the display picture and the cartoon image has a close resemblance to a display picture-target cartoon image pair, the system (200) further configured to compare the pair of the display picture and the cartoon image with the display picture-target cartoon image pair to improve image identity, minimize image loss, and improve expression preservation while training the image-to-image translation network.

12. The system (200) as claimed in claim 9, wherein the digital picture includes jpeg, png, and raw file images.

13. The system (200) as claimed in claim 9, wherein a range of the pixel intensity values of the facial normalized image is projected to a predefined range between [−1] to [1].

14. The system (200) as claimed in claim 9, wherein customization of the cartoon image includes extracting and transferring the face tone of the photorealistic content to the cartoon image.

15. The system (200) as claimed in claim 9, wherein the customized sticker body includes stories, gifs, and stickers.

* * * * *